United States Patent
Zhang et al.

(10) Patent No.: US 8,862,601 B2
(45) Date of Patent: Oct. 14, 2014

(54) METHOD AND DEVICE FOR DRM FILE CONVERSION

(75) Inventors: Bo Zhang, Beijing (CN); Yingwei Li, Beijing (CN); Zhiquan Yuan, Shenzhen (CN); Yajun Zhang, legal representative, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 230 days.

(21) Appl. No.: 13/168,647

(22) Filed: Jun. 24, 2011

(65) Prior Publication Data

US 2011/0270854 A1    Nov. 3, 2011

Related U.S. Application Data

(63) Continuation of application No. PCT/CN2009/076003, filed on Dec. 24, 2009.

(30) Foreign Application Priority Data

Dec. 25, 2008  (CN) .......................... 2008 1 0186568

(51) Int. Cl.
*G06F 17/30* (2006.01)
*G06F 21/10* (2013.01)
*H04L 12/58* (2006.01)

(52) U.S. Cl.
CPC ................ *H04L 12/58* (2013.01); *G06F 21/10* (2013.01)
USPC ....................................................... 707/755

(58) Field of Classification Search
USPC ................... 709/203; 707/755; 713/153, 168; 726/28, 27, 26
See application file for complete search history.

(56) References Cited

U.S. PATENT DOCUMENTS

| 8,037,506 B2* | 10/2011 | Cooper et al. ................... 725/93 |
| 8,055,899 B2* | 11/2011 | Levy et al. ..................... 713/176 |
| 8,369,528 B2* | 2/2013 | Kwak et al. .................... 380/278 |
| 8,607,354 B2* | 12/2013 | Levy et al. ...................... 726/26 |

(Continued)

FOREIGN PATENT DOCUMENTS

| CN | 1938700 A | 3/2007 |
| CN | 101044441 A | 9/2007 |

(Continued)

OTHER PUBLICATIONS

Integrating Content Management with Digital Rights Management, Rosenblatt et al., May 14, 2003.*

(Continued)

*Primary Examiner* — Jean M Corrielus
(74) *Attorney, Agent, or Firm* — Brinks Gilson & Lione

(57) ABSTRACT

A method for DRM file conversion is provided in an embodiment of the present disclosure, including: parsing a multipurpose Internet mail extensions (MIME) parameter in a rights type system of a DRM file to obtain file types and rights formats to which the DRM file can be converted; and converting, according to the file types and rights formats to which the DRM file can be converted, the DRM file into a file type and a rights format in the file types and rights formats to which the DRM file can be converted, where the file type and rights format is supported by a DRM system that receives the DRM file. A device for DRM file conversion is provided in another embodiment of the present disclosure.

6 Claims, 2 Drawing Sheets

(56) References Cited

U.S. PATENT DOCUMENTS

| | | | |
|---|---|---|---|
| 2003/0046274 A1* | 3/2003 | Erickson et al. | 707/3 |
| 2004/0205333 A1 | 10/2004 | Bjorkengren | |
| 2005/0132264 A1* | 6/2005 | Joshi et al. | 715/500.1 |
| 2005/0209995 A1* | 9/2005 | Aksu et al. | 707/1 |
| 2006/0010500 A1* | 1/2006 | Elazar et al. | 726/27 |
| 2006/0062426 A1* | 3/2006 | Levy et al. | 382/100 |
| 2006/0080529 A1* | 4/2006 | Yoon et al. | 713/168 |
| 2006/0117391 A1* | 6/2006 | Kim | 726/27 |
| 2007/0162977 A1* | 7/2007 | Kuo et al. | 726/26 |
| 2007/0220575 A1* | 9/2007 | Cooper et al. | 725/118 |
| 2007/0255659 A1* | 11/2007 | Yen et al. | 705/51 |
| 2008/0025507 A1* | 1/2008 | Taylor | 380/201 |
| 2008/0046373 A1* | 2/2008 | Kim | 705/51 |
| 2008/0140433 A1* | 6/2008 | Levy et al. | 705/1 |
| 2008/0250508 A1 | 10/2008 | Montague et al. | |
| 2009/0063871 A1 | 3/2009 | Frijters et al. | |
| 2009/0122991 A1* | 5/2009 | Kwak et al. | 380/278 |
| 2010/0023927 A1* | 1/2010 | Yang et al. | 717/120 |
| 2010/0169221 A1* | 7/2010 | Ahn et al. | 705/54 |
| 2010/0169652 A1* | 7/2010 | Butler | 713/176 |
| 2010/0257370 A1 | 10/2010 | Yoon et al. | |

FOREIGN PATENT DOCUMENTS

| | | |
|---|---|---|
| CN | 101044475 A | 9/2007 |
| CN | 101477598 A | 7/2009 |
| EP | 1564622 A2 | 8/2005 |
| WO | WO 2006/043784 A1 | 4/2006 |
| WO | WO 2007/117112 A1 | 10/2007 |
| WO | WO 2007/123373 A1 | 11/2007 |

OTHER PUBLICATIONS

Extended European Search Report issued in corresponding European Patent Application No. 09834118.3, mailed Dec. 6, 2011.

Written Opinion of the International Searching Authority issued in corresponding PCT Patent Application No. PCT/CN2009/076003, mailed Apr. 1, 2010.

International Search Report issued in corresponding PCT Application No. PCT/CN2009/076003; mailed Apr. 1, 2010.

"DRM Content Format V2.0 Draft Version 2.0" Open Mobile Alliance. Apr. 20, 2004.

Freed et al. "Multipurpose Internet Mail Extensions (MIME) Part One: Format of Internet Message Bodies" Network Working Group. Nov. 1996.

Freed et al. "Multipurpose Internet Mail Extensions (MIME) Part Two: Media Types" Network Working Group. Nov. 1996.

Moore et al. " MIME (Multipurpose Internet Mail Extensions) Part Three: Message Header Extensions for non-ASCII Text" Network Working Group. Nov. 1996.

* cited by examiner

METHOD AND DEVICE FOR DRM FILE CONVERSION

CROSS-REFERENCE TO RELATED APPLICATIONS

This application is a continuation of International Application No. PCT/CN2009/076003, filed on Dec. 24, 2009, which claims priority to Chinese Patent Application No. 200810186568.1, filed on Dec. 25, 2008, both of which are hereby incorporated by reference in their entireties.

FIELD

The present disclosure relates to a Digital Rights Management (DRM) technology field, and in particular, to a method and device for DRM file conversion.

BACKGROUND

As DRM technologies are widely used, DRM files can be transmitted to different DRM systems by using various methods such as Bluetooth, infrared ray, and downloading. However, the file types and rights formats in DRM files supported by different DRM systems may vary. Therefore, when a DRM file is transmitted from one DRM file (for example, Open Mobile Architecture (OMA) DRM system) to another DRM system (for example, Windows Media DRM system), the file type and rights format of the DRM file need to be converted.

During implementation of the present disclosure, the inventor has found at least the following problems facing existing technologies when a DRM file is transmitted from one DRM file to another DRM system: From the existing rights type system, for example, OMA DRM 2.0 rights type system, only the system ID of the DRM system (for example, Windows Media DRM system and Helix DRM system), to which the DRM file can be converted, can be obtained, but the file types or rights formats to which the DRM file can be converted cannot be obtained. Therefore, the DRM file cannot be converted, bringing unnecessary problems for users.

SUMMARY

Embodiments of the present disclosure provide a method and device for DRM file conversion, so that the file types and rights formats to which a DRM file can be converted can be directly obtained from the rights type system of the DRM file, thus facilitating conversion of the DRM file to the file type and rights format supported by the DRM system that receives the DRM file.

A method for DRM file conversion is provided in an embodiment of the present disclosure. The method includes: parsing a multipurpose Internet mail extensions (MIME) parameter in a rights type system of a DRM file to obtain file types and rights formats to which the DRM file can be converted; and according to the file types and rights formats to which the DRM file can be converted, converting the DRM file into a file type and a rights format in the file types and rights formats to which the DRM file can be converted, where the file type and rights format is supported by a DRM system that receives the DRM file.

A device for DRM file conversion is provided in an embodiment of the present disclosure. The device includes: a parsing module, configured to parse an MIME parameter in a rights type system of a DRM file to obtain file types and rights formats to which the DRM file can be converted; and a converting module, configured to, according to the file types and rights formats to which the DRM file can be converted, convert the DRM file into a file type and a rights format in the file types and rights formats to which the DRM file can be converted, where the file type and rights format is supported by a DRM system that receives the DRM file.

In an embodiment of the present disclosure, the file types and rights formats to which the DRM file can be converted can be directly obtained by parsing the MIME parameter in the rights type system of the DRM file, greatly facilitating users.

BRIEF DESCRIPTION OF THE DRAWINGS

To better illustrate the present disclosure or technical solution by using the existing technologies, the drawings that need to be used in the present disclosure or the description of existing technologies are presented in embodiments of the present disclosure. It is understandable that the drawings merely provide several applications of the present disclosure. Those skilled in the art can obtain other drawings based on these drawings without creative work.

DETAILED DESCRIPTION

The technical solution under the present disclosure is elaborated below with reference to accompanying drawings. Evidently, the embodiments described below are for the exemplary purpose only, without covering all embodiments of the present disclosure. All the other embodiments obtained by those skilled in the art without creative work based on the embodiments of the present disclosure are protected by the present disclosure.

The following describes the present disclosure by combing drawings in detail.

A method and device for DRM file conversion is provided in an embodiment of the present disclosure to allow the file types and rights formats to which a DRM file can be converted to be directly obtained from the rights type system of the DRM file, thus facilitating conversion of the DRM file to the file type and rights format supported by the DRM system that receives the DRM file.

Embodiment 1

Figure 1:
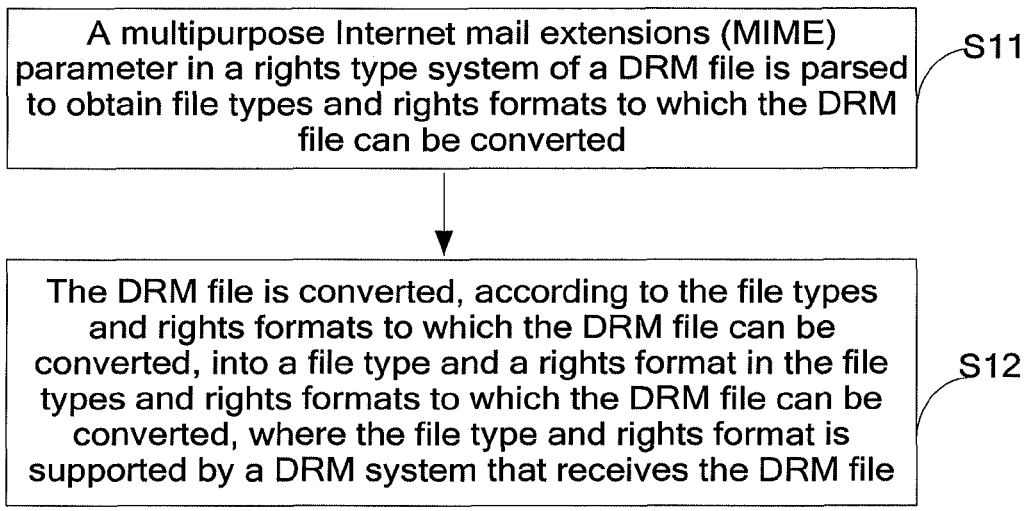
FIG. 1 is a flowchart of a method for converting a file type and a rights format of a DRM file according to a first embodiment of the present disclosure.

FIG. 1 is a flowchart of a method for converting a file type and a rights format of a DRM file according to a first embodiment of the present disclosure. As shown in FIG. 1, this method includes:

Step 11: A multipurpose Internet mail extensions (MIME) parameter in a rights type system of a DRM file is parsed to obtain file types and rights formats to which the DRM file can be converted; and Step 12: The DRM file is converted, according to the file types and rights formats to which the DRM file can be converted, into a file type and a rights format in the file types and rights formats to which the DRM file can be converted, where the file type and rights format is supported by a DRM system that receives the DRM file. That is, The DRM file is converted into a file type and a rights format in the file types and rights formats to which the DRM file can be converted, and the file type and the rights format after conversion is supported by a DRM system that receives the DRM file.

In this embodiment, the MIME parameter in the rights type system of the DRM file includes the file types and rights formats to which the DRM file can be converted. The DRM Agent module in a terminal device obtains, by parsing the MIME parameter, the file types and rights formats to which the DRM file can be converted, and then converts, according to the file types and rights formats to which the DRM file can be converted, the DRM file into a file type and a rights format in the file types and rights formats to which the DRM file can be converted. For example, if the DRM system that receives the DRM file supports the mp3 file type and rights format, and the files to which the DRM file can be converted include the mp3 file type and rights format, the terminal device determines, according to its capability, whether to convert this DRM file. If the capability of the terminal device supports the conversion, the DRM Agent in the terminal device converts the DRM file into the file type and rights format supported by the DRM system that receives the DRM file. If the capability of the terminal device does not support the conversion, the terminal device can choose not to output, or, according to user instructions, not to convert the file type and rights format of the original file.

Embodiment 2

Figure 2:
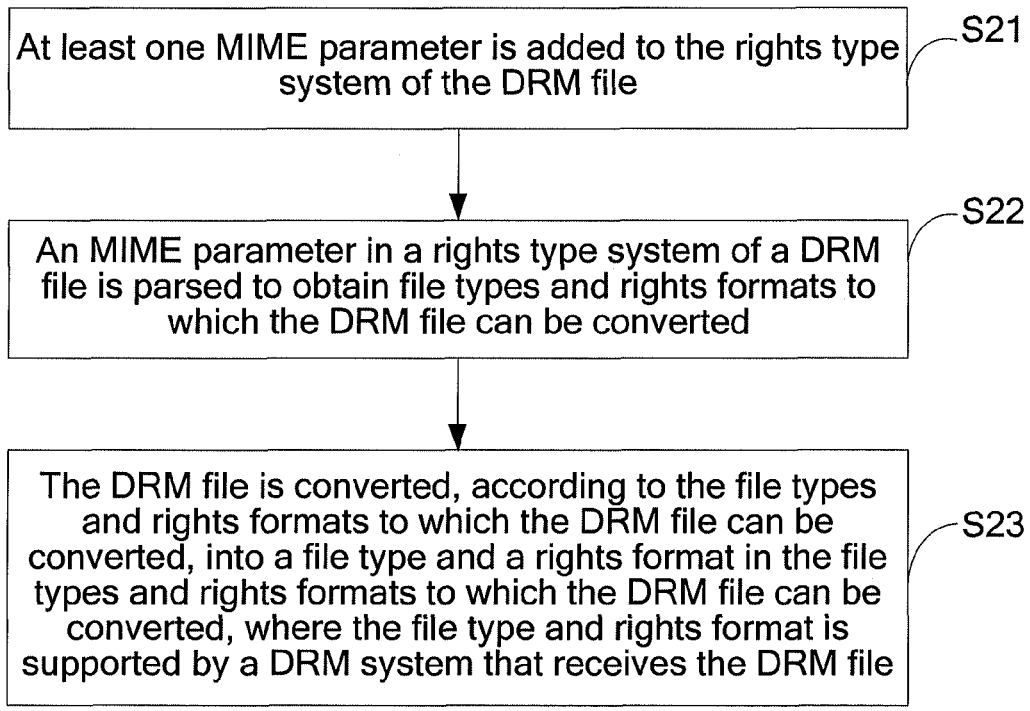
FIG. 2 is a flowchart of a method for converting a file type and a rights format of a DRM file according to a second embodiment of the present disclosure.

FIG. 2 is a flowchart of a method for converting a file type and a rights format of a DRM file according to a second embodiment of the present disclosure. As shown in FIG. 2, this method includes:

Step 21: At least one MIME parameter is added to a rights type system of the DRM file, where the MIME parameter includes file types and rights formats to which the DRM file can be converted.

Step 22: The MIME parameter in the rights type system of the DRM file is parsed to obtain the file types and rights formats to which the DRM file can be converted.

Step 23: The DRM file is converted, according to the file types and rights formats to which the DRM file can be converted, into a file type and a rights format in the file types and rights formats to which the DRM file can be converted, where the file type and rights format is supported by a DRM system that receives the DRM file.

In this embodiment, each MIME parameter includes a file type element and a rights format element, where the file type elements includes file types to which the DRM file can be converted, and the rights format element includes rights formats to which the DRM file can be converted.

In this embodiment, when multiple MIME parameters exist, the multiple MIME parameters in the rights type system of the DRM file are parsed respectively to obtain all file types and rights formats to which the DRM file can be converted, and the DRM file is converted into a file type and rights format supported by the DRM system that receives the DRM file in the file types and rights formats to which the DRM file can be converted according to the instruction entered by the user.

This embodiment takes the scenario in which the rights type system of the DRM file is OMA DRM 2.0 and the MIME parameter is included in the system element for example to describe the process of converting the file type and rights format of the DRM file.

At least one MIME parameter is added to the rights type system OMA DRM 2.0. Each MIME parameter includes a file type element (for example, systemfiletype) and a rights format element (for example, systemrotype). The DRM Agent module in a terminal device can obtain, by parsing systemfiletype, the file types to which the DRM file can be converted. The DRM Agent module in the terminal device can obtain, by parsing systemrotype, the rights formats to which the DRM file can be converted. The procedure for parsing the MIME parameter by the DRM Agent in the terminal device is as follows:

the export element is parsed to obtain the system element;

the obtained system element is parsed to obtain system IDs of the DRM systems that receive the DRM file; and the MIME parameter is further parsed according to a system ID selected by the user from the obtained system IDs, to obtain the file types and rights formats to which the DRM file can be converted.

When obtaining system IDs of the DRM systems that receive the DRM file, the DRM Agent module can display the system IDs on the screen of the terminal device. After the user selects a system ID of the DRM system that receives the DRM file, the DRM Agent module further parses systemfiletype and systemrotype in the MIME parameter according to the selected system ID to obtain the file types and rights formats to which the DRM file can be converted. If multiple MIME parameters exist, the DRM Agent module parses the multiple MIME parameters in the rights type system of the DRM file to obtain all file types and rights formats to which the DRM file can be converted.

At last, the DRM Agent module in the terminal device converts the DRM file into the file type and rights format supported by the DRM system that receives the DRM file. If the DRM system that receives the DRM file supports multiple file types and rights formats, the terminal device prompts the user to select a file type and a rights format. Then, the terminal device converts, according to the instruction entered by the user, the DRM file into the file type and rights format supported by the DRM system that receives the DRM file.

In this embodiment, the system ID of the DRM system that receives the DRM file can be determined by using the function of the system element. If the DRM system that receives the DRM file does not support the conversion, parsing or conversion is not implemented, thus saving unnecessary operations and greatly facilitating users.

Embodiment 3

A DRM system in the existing telecommunication field includes a DRM Agent module that is installed on a terminal device. To implement the present embodiment, several modules need to be added to the DRM Agent module.

Figure 3:
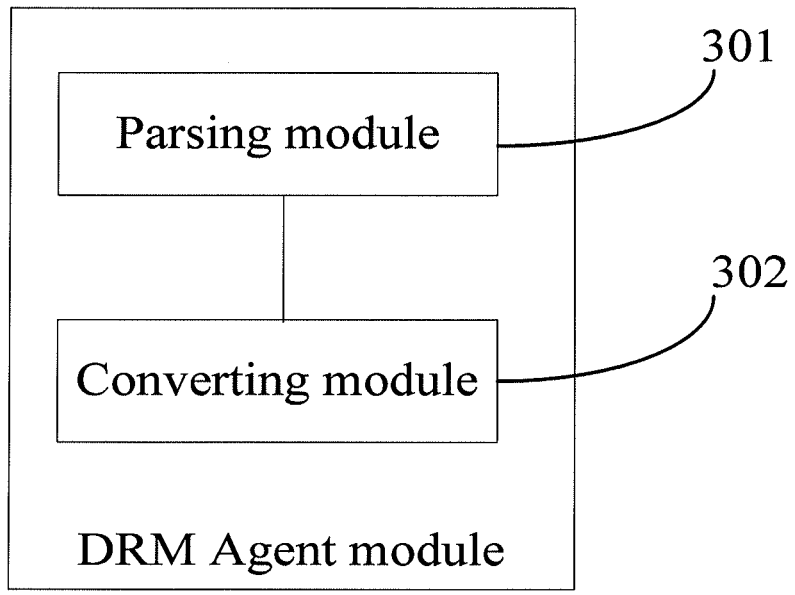
FIG. 3 is a schematic block diagram showing a structure of a device for converting a file type and a rights format of a DRM file according to a third embodiment of the present disclosure.

FIG. 3 is a schematic block diagram showing a structure of a device for converting a file type and a rights format of a DRM file according to a third embodiment of the present disclosure. As shown in FIG. 3, this device includes:

a parsing module 301, configured to parse an MIME parameter in a rights type system of a DRM file to obtain file types and rights formats to which the DRM file can be converted; and a converting module 302, configured to convert, according to the file types and rights formats to which the DRM file can be converted, the DRM file into a file type and a rights format in the file types and rights formats to which the DRM file can be converted, where the file type and rights format is supported by a DRM system that receives the DRM file.

In this embodiment, the MIME parameter in the rights type system of the DRM file includes the file types and rights formats to which the DRM file can be converted. The parsing module 301 obtains, by parsing the MIME parameter, the file types and rights formats to which the DRM file can be converted, and then the converting module converts, according to the file types and rights formats to which the DRM file can be converted, the DRM file into a file type and a rights format in the file types and rights formats to which the DRM file can be converted. For example, if the DRM system that receives the DRM file supports the mp3 file type and rights format, and the files to which the DRM file can be converted include the mp3 file type and rights format, the terminal device determines, according to its capability, whether to convert this DRM file. If the capability of the terminal device supports the conversion, the DRM Agent in the terminal device converts the DRM file into the file type and rights format supported by the DRM system that receives the DRM file. If the capability of the terminal device does not support the conversion, the terminal device can choose not to implement any handling, or, according to user instructions, not to convert the file type and rights format of the original file.

Embodiment 4

Figure 4:
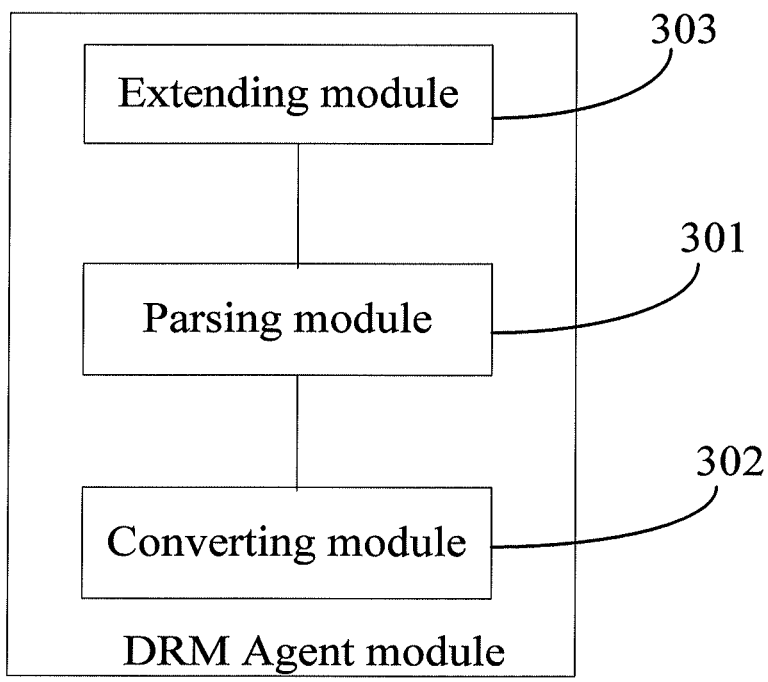
FIG. 4 is a schematic block diagram showing a structure of a device for converting a file type and a rights format of a DRM file according to a fourth embodiment of the present disclosure.

FIG. 4 is a schematic block diagram showing a structure of a device for converting a file type and a rights format of a DRM file according to a fourth embodiment of the present disclosure. As shown in FIG. 4, this device includes:

an extending module 303, configured to add at least one MIME parameter to a rights type system of the DRM file, where the MIME parameter includes file types and rights formats to which the DRM file can be converted;

a parsing module 301, configured to parse an MIME parameter in a rights type system of a DRM file to obtain file types and rights formats to which the DRM file can be converted; and a converting module 302, configured to convert, according to the file types and rights formats to which the DRM file can be converted, the DRM file into a file type and a rights format in the file types and rights formats to which the DRM file can be converted, where the file type and rights format is supported by a DRM system that receives the DRM file.

In this embodiment, each MIME parameter includes a file type element and a rights format element, where the file type elements includes file types to which the DRM file can be converted, and the rights format element includes rights formats to which the DRM file can be converted.

In this embodiment, when multiple MIME parameters exist, the parsing module 301 parses the MIME parameters in the rights type system of the DRM file respectively to obtain all file types and rights formats to which the DRM file can be converted, and the DRM file is converted, according to the instruction entered by the user, into a file type and rights format supported by the DRM system that receives the DRM file in the file types and rights formats to which the DRM file can be converted.

This embodiment takes the scenario in which the rights type system of the DRM file is OMA DRM 2.0 and the MIME parameter is included in the system element for example to describe the process of converting the file type and rights format of the DRM file:

The extending module 303 adds at least one MIME parameter to the rights type system OMA DRM 2.0. Each MIME parameter includes a file type element (such as systemfile-type) and a rights format element (such as systemrotype). The parsing module 301 obtains, by parsing systemfiletype, the file types to which the DRM file can be converted, and obtains, by parsing systemrotype, the rights formats to which the DRM file can be converted. The parsing module 301 further includes:

an export element parsing unit, configured to parse the export element to obtain the system element;

a system element parsing unit, configured to obtain, by parsing the system element obtained by the export element parsing unit, system IDs of the DRM systems that receive the DRM file; and a MIME parameter parsing unit, configured to parse the MIME parameter according to a system ID selected by the user from the obtained system IDs, to obtain the file types and rights formats to which the DRM file can be converted;

When obtaining system IDs of the DRM systems that receive the DRM file, the system element parsing unit can display the system IDs on the screen of the terminal device. After the user selects a system ID of the DRM system that receives the DRM file, the MIME parameter parsing unit parses systemfiletype and systemrotype in the MIME parameter according to the selected system ID to obtain the file types and rights formats to which the DRM file can be converted. If multiple MIME parameters exist, the parsing module parses the MIME parameters in the rights type system of the DRM file to obtain all file types and rights formats to which the DRM file can be converted; and At last, the converting module 302 converts the DRM file into the file type and rights format supported by the DRM system that receives the DRM file. If the DRM system that receives the DRM file supports multiple file types and rights formats, the terminal device prompts the user to select a file type and a rights format. Then, the terminal device converts, according to the instruction entered by the user, the DRM file into the file type and rights format supported by the DRM system that receives the DRM file.

It can be understood by those skilled in the art that all or certain steps in the preceding embodiments of the present disclosure can be performed by instructing related hardware such as a processor through a program. The program may be stored in a storage medium that can be read by a computer or a processor. When being executed, the program performs the steps in the preceding embodiments of the present disclosure. The storage medium can be ROM, RAM, disk, or CD that can store program codes.

In this embodiment, the system ID of the DRM system that receives the DRM file can be determined by using the function of the system element. If the DRM system that receives the DRM file does not support the conversion, parsing or conversion is not implemented, thus saving unnecessary operations and greatly facilitating users.

The preceding are specific implementation methods of the present disclosure. Those skilled in the art can make various modifications and variations to the disclosure without departing from the spirit and scope of the disclosure. The disclosure is intended to cover the modifications and variations provided that they fall in the protection scope defined by the following claims or their equivalents.

What is claimed is:

1. A method for Digital Rights Management (DRM) file conversion, the method comprising:

parsing a multipurpose Internet mail extensions (MIME) parameter according to the rights type system of the DRM file to obtain file types and rights formats to which the DRM file is to convert, wherein at least one multipurpose Internet mail extensions (MIME) parameter is added to a rights type system of the DRM file, and the MIME parameter comprises file types and rights formats to which the DRM file is to convert; and converting, according to the file types and rights formats, the DRM file into a file type and a rights format which is supported by the DRM system that receives the DRM file, wherein the MIME parameter is included in a system element, and the procedure for obtaining the file types and rights formats to which the DRM file is to convert comprises:

parsing an export element to obtain the system element;

parsing the obtained system element to obtain system IDs of a DRM system that receives the DRM file; and parsing the MIME parameter according to a system ID selected, by a user, from the obtained system IDs, to obtain the file types and rights formats to which the DRM file is to convert.

2. The method according to claim 1, wherein each MIME parameter comprises a file type element and a rights format element, and the file type element comprises the file types to which the DRM file is to convert; and the rights format element comprises the rights formats to which the DRM file is to convert.

3. The method according to claim 2, wherein when multiple MIME parameters exist, the MIME parameters in the rights type system of the DRM file are parsed respectively to obtain all file types and rights formats to which the DRM file is to convert, and the DRM file is converted, according to an instruction entered by a user, into a file type and rights format supported by a DRM system that receives the DRM file in the file types and rights formats to which the DRM file is to convert.

4. A non-transitory computer-readable storage medium having stored codes and instructions, when executed by a processor, causes a computer to perform a method for Digital Rights Management (DRM) file conversion, the method comprising:

parsing a MIME parameter according to the rights type system of the DRM file to obtain file types and rights formats to which the DRM file is to convert, wherein at least one multipurpose Internet mail extensions (MIME) parameter is added to the rights type system of the DRM file, and the MIME parameter comprises file types and rights formats to which the DRM file is to convert; and converting, according to the file types and rights formats, the DRM file into a file type and a rights format which is supported by the DRM system that receives the DRM file, wherein the MIME parameter is included in the system element, and parsing an MIME parameter in a rights type system of a DRM file to obtain file types and rights formats to which the DRM file is to convert further comprises:

parsing the export element to obtain the system element;

by parsing the system element obtained, obtaining system IDs of the DRM system that receive the DRM file; and parsing the MIME parameter according to a system ID selected by the user from the obtained system IDs, to obtain the file types and rights formats to which the DRM file is to convert.

5. The non-transitory computer-readable storage medium according to claim 4, wherein each MIME parameter comprises a file type element and a rights format element, and the file type element comprises the file types to which the DRM file is to convert; and the rights format element comprises the rights formats to which the DRM file is to convert.

6. The non-transitory computer-readable storage medium according to claim 5, wherein when multiple MIME parameters exist, the MIME parameters in the rights type system of the DRM file are parsed respectively to obtain all file types and rights formats to which the DRM file is to convert, and the DRM file is converted, according to an instruction entered by a user, into a file type and rights format supported by a DRM system that receives the DRM file in the file types and rights formats to which the DRM file is to convert.

* * * * *